United States Patent [19]
Sasaki

[11] Patent Number: 5,112,170
[45] Date of Patent: May 12, 1992

[54] CASTING FIN REMOVING APPARATUS FOR ALUMINUM WHEEL

[75] Inventor: Hitoshi Sasaki, Yoshida, Japan

[73] Assignee: Endo Kogyo Co., Ltd., Niigata, Japan

[21] Appl. No.: 649,769

[22] Filed: Jan. 25, 1991

[30] Foreign Application Priority Data

Mar. 20, 1990 [JP] Japan .................................. 2-68369

[51] Int. Cl.⁵ .............................................. B23C 3/12
[52] U.S. Cl. .................................. 409/124; 409/140; 409/213
[58] Field of Search ............... 409/139, 140, 121, 124, 409/106, 107, 108, 109, 213, 300; 29/33 A

[56] References Cited

U.S. PATENT DOCUMENTS

| | | |
|---|---|---|
| 3,097,570 | 7/1963 | Mackey .............................. 409/140 |
| 3,952,630 | 4/1976 | Fencl et al. ........................ 409/140 |
| 4,221,514 | 9/1980 | Pavlorsky ....................... 409/300 X |

FOREIGN PATENT DOCUMENTS

| | | |
|---|---|---|
| 0019311 | 1/1987 | Japan ................................. 409/140 |
| 0619298 | 8/1978 | U.S.S.R. ............................. 409/106 |

Primary Examiner—Z. R. Bilinsky
Attorney, Agent, or Firm—Shapiro and Shapiro

[57] ABSTRACT

An apparatus for removing a casting fin created on the tire-mounting surface of an aluminum wheel comprises: a chuck for positioning the center of the aluminum wheel at a predetermined position in the apparatus and positioning the casting fin on a predetermined line passing through the predetermined position; a stylus for movement following the profile of the tire-mounting surface of the aluminum wheel; and a cutter having a rotary shaft parallel to the center axis of the aluminum wheel and moved to a casting fin removing position along a line passing through the predetermined position at an angle with respect to the predetermined line for removing the casting fin of the aluminum wheel in accordance with the profile movement of the stylus.

4 Claims, 4 Drawing Sheets 5,112,170

CASTING FIN REMOVING APPARATUS FOR ALUMINUM WHEEL

BACKGROUND OF THE INVENTION

1. Field of the Invention

This invention relates to a fin removing apparatus for removing the casting fin of an aluminum wheel created by casting in the process of manufacturing the aluminum wheel.

2. Related Background Art

Aluminum wheels, for which demand has recently been rapidly increasing for use with automobiles and motorcycles, are manufactured by a casting method such as gravity casting or low-pressure casting. The manufacturing process of aluminum wheels generally adopts the following steps:

casting→cooling→casting fin
removal→ingate and dead head
severing→lathing and among these, casting fin removal and ingate and dead head severing are steps necessary for decreasing the number of lathing steps.

A longitudinal cross-sectional view of an aluminum wheel 1 with casting fins is shown in FIG. 1 of the accompanying drawings, and a transverse cross-sectional view taken along line 2—2 of FIG. 1 is shown in FIG. 2 of the accompanying drawings.

Casting fins are usually created on the flange portion 3 of a surface 2 of the aluminum wheel 1 on which a design is made, and on the tire-mounting surface 4 of the aluminum wheel. On the flange portion 3, a casting fin 3a is created over the whole circumference thereof. On the tire-mounting surface 4, casting fins 4a are created at two locations spaced apart by 180 degrees with respect to the center axis of the aluminum wheel 1 due to the relation with a metal mold.

The configurations of the tire-mounting surface 4 on which the casting fins 4a are created are multifarious because the dimensions of the aluminum wheel 1 are multifarious. Heretofore, such casting fins 4a have been manually removed by the use of a grinder or the like.

In the prior art as described above, the manual removal of the casting fins of the aluminum wheel by the use of a grinder or the like has been a major factor leading to increased costs. So, various attempts have been made to automate this work by a method using a robot or an NC apparatus, but this method has not yet been put into practical use because very much time is required for the teaching of the robot or the programming of the NC apparatus and the working time is lengthy and the apparatus becomes expensive. For this reason, there has been desired a casting fin removing apparatus of simple structure which can accommodate aluminum wheels of all configurations and dimensions.

SUMMARY OF THE INVENTION

The present invention has as its object the provision of an automated casting fin removing apparatus which can accommodate various configurations and dimensions of tire-mounting surfaces which and can accurately and quickly remove casting fins created on the tire-mounting surfaces without requiring the change-over or the like of a machining program.

To solve the above-noted problems, according to the present invention, an apparatus for removing casting fins extending on the tire-mounting surface of an aluminum wheel and along the axial direction of the aluminum wheel is provided with:

means for positioning the center of said aluminum wheel at a predetermined position and positioning said casting fins on a predetermined line passing through said predetermined position;

styluses for moving along the profile of the tire-mounting surface of said aluminum wheel; and cutters each having a rotary shaft parallel to the center axis of said aluminum wheel and adapted to be fed to a casting fin removing position along lines passing through said predetermined position at a predetermined angle with respect to said predetermined line to thereby remove the casting fins of said aluminum wheel in accordance with said movement of said styluses.

As will be more fully appreciated from the detailed description hereinafter, the present invention makes it possible to accurately remove the casting fins of the tire-mounting surfaces of various aluminum wheels differing in configuration and dimensions.

DETAILED DESCRIPTION OF THE PREFERRED EMBODIMENTS

The present invention will now be described with reference to the drawings.

Figure 1:
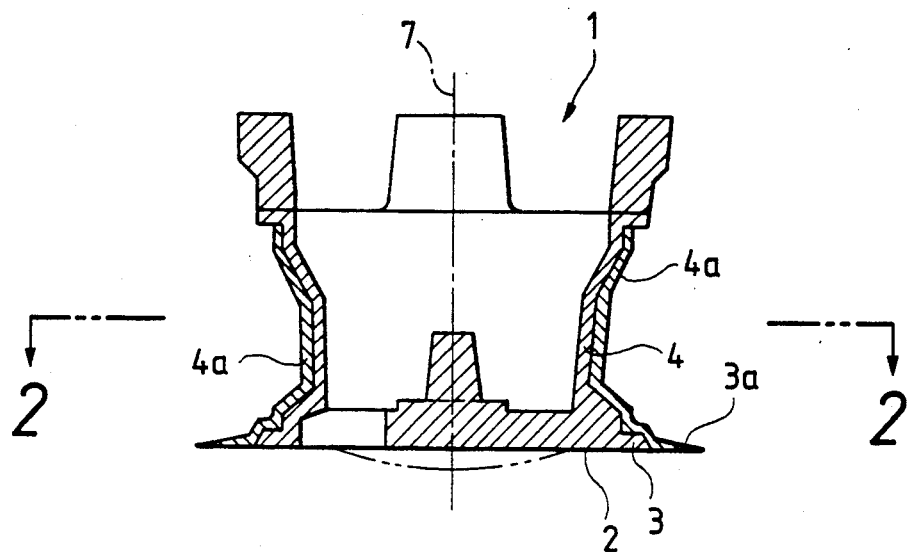
FIG. 1 is a longitudinal cross-sectional view of an aluminum wheel with casting fins.
Figure 2:
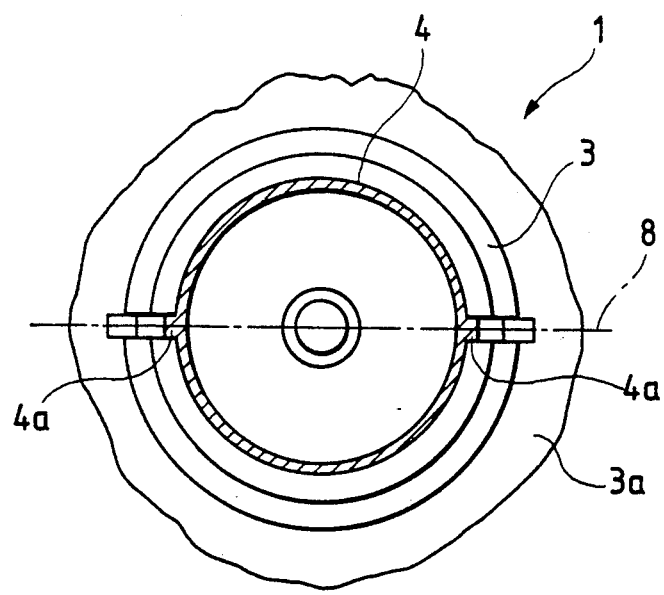
FIG. 2 is a transverse cross-sectional view taken along line 2—2 of FIG. 1.
Figure 3:
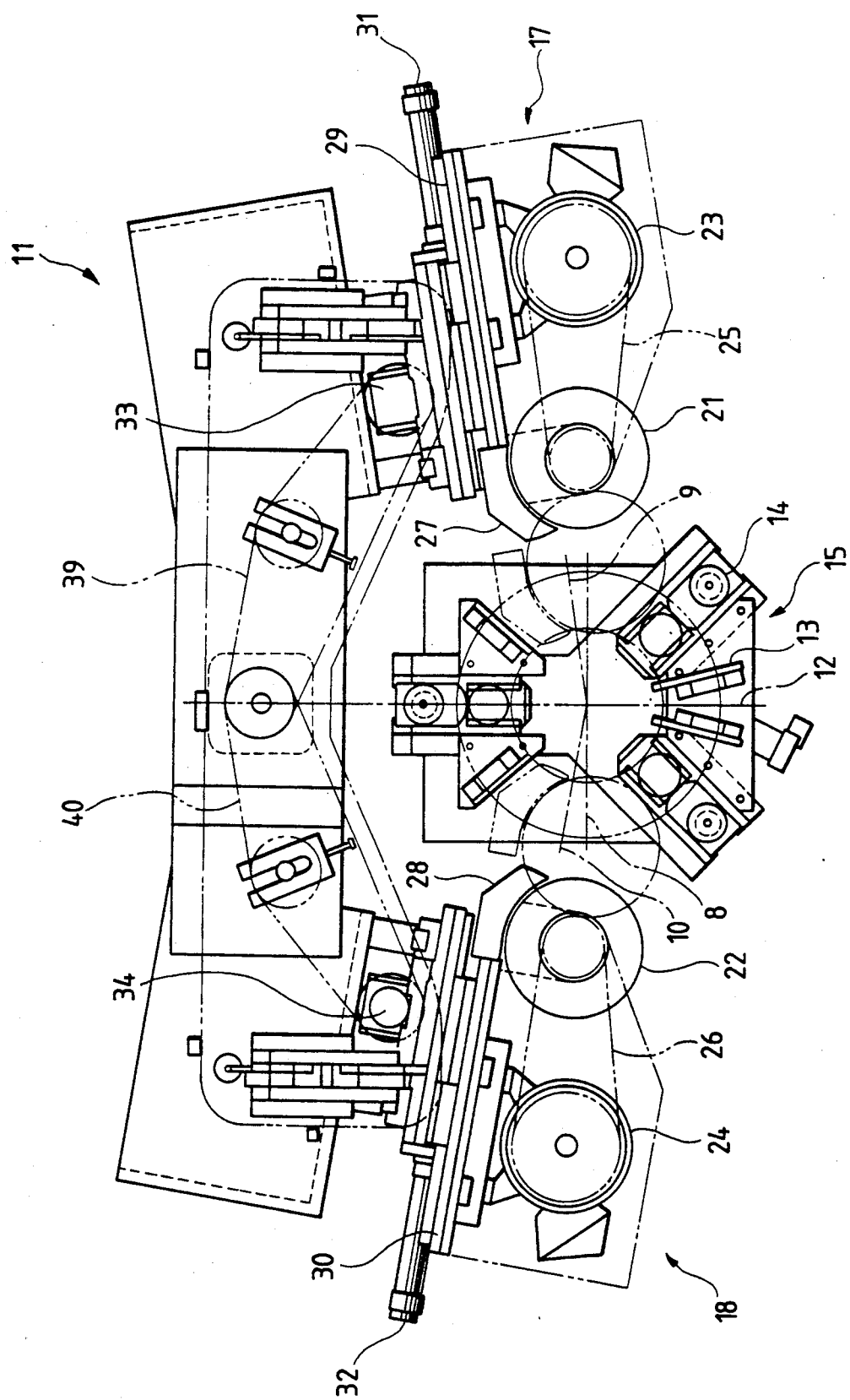
FIG. 3 is a plan view of a casting fin removing apparatus according to the present invention.
Figure 4:
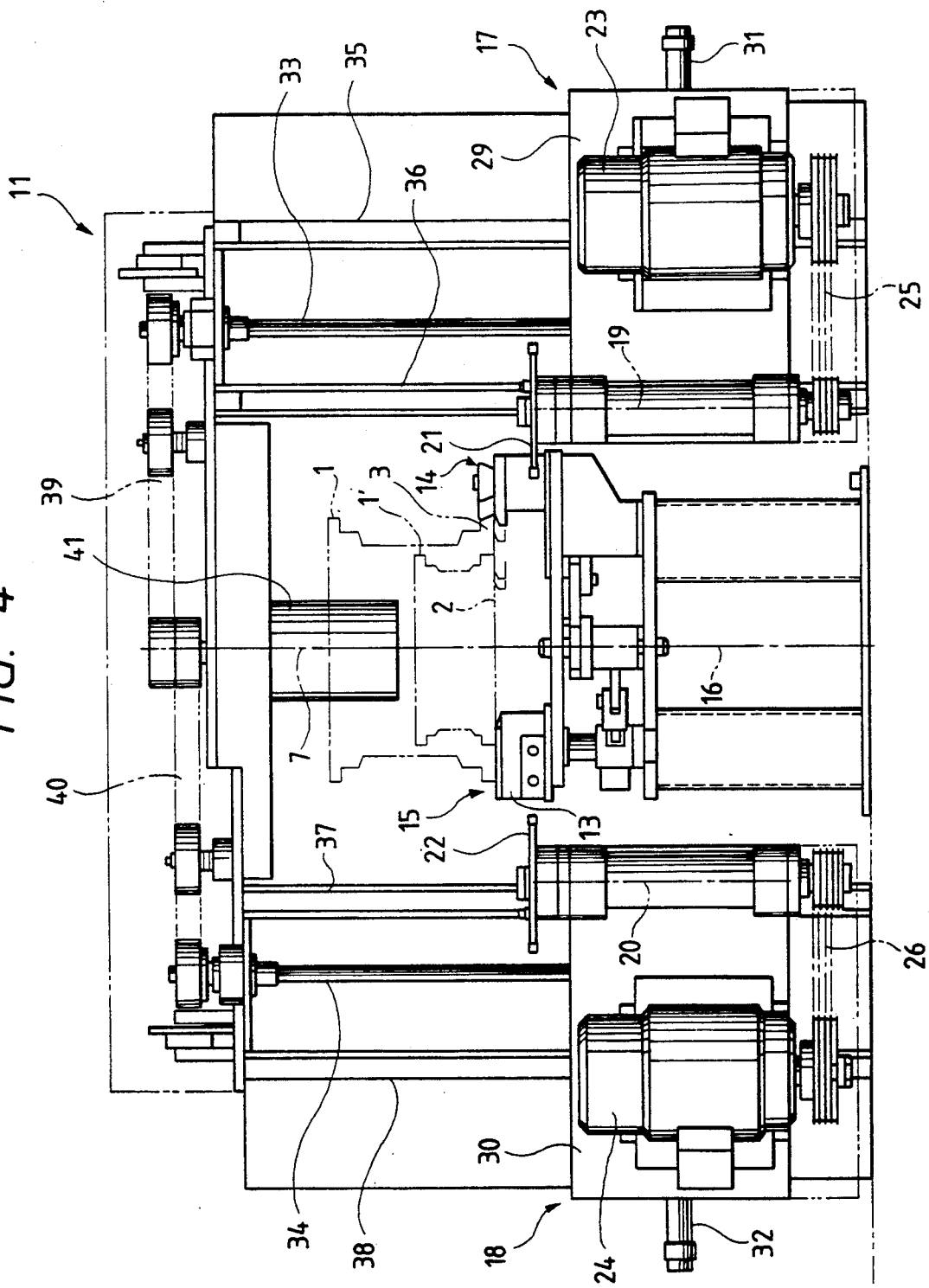
FIG. 4 is a front view of the casting fin removing apparatus according to the present invention.

FIGS. 3 and 4 respectively show plan and front views of a casting fin removing apparatus 11 in accordance with a preferred embodiment of the invention.

In FIG. 4, two aluminum wheels 1 and 1' of different sizes are indicated by phantom lines. One such wheel 1, for example, is loaded onto a chuck stand 13 of a chuck unit 15 of the apparatus 11 by a loader, not shown. The wheel is loaded such that a line 8 passing through the two casting fins 4a of the tire-mounting surface 4 may be oriented in a direction perpendicular to the center line 12 of the apparatus 11 shown in FIG. 3. The wheel is chucked by a three-pawl chuck 14 so that the center line (axis) 7 of the aluminum wheel 1 and the center line 16 of the chuck unit 15 align with each other.

Two head units 17 and 18 are installed in opposed relationship with each other at opposite sides of the chuck unit 15. The head units 17 and 18 are respectively comprised of fin removing cutters 21 and 22 having rotary shafts 19 and 20 parallel to the center line 16 of the chuck unit 15, (i.e., parallel to the center line 7 of the aluminum wheel 1 chucked by the three-pawl chuck 14); cutter driving motors 23 and 24 for driving the cutters 21 and 22; belts 25 and 26 for transmitting the drive forces of the cutter driving motors 23 and 24 to the cutters 21 and 22; styluses 27 and 28 disposed adjacent to and at the same distance as the cutters 21 and 22 with respect to the axis 7 of the aluminum wheel 1, and having their tip ends formed by arcs of the same radius as that of the cutters 21 and 22; and bases 29 and 30 for fixing the cutters 21, 22, the cutter driving motors 23, 24 and the styluses 27, 28.

The bases 29 and 30 are moved toward and away from the aluminum wheel 1 along directions parallel to straight lines 9 and 10, which are inclined at about 10° with respect to the line 8 passing through the two casting fins 4a of the aluminum wheel 1 and the wheel axis. Such movement is effected by longitudinally moving mechanisms 31 and 32, each comprising an air cylinder, etc. Also, the bases 29 and 30 are supported by ball screws 33 and 34 parallel to the axis 7 of the aluminum wheel, and are guided along a direction parallel to the axis 7 by guide ways 35, 36 and 37, 38 parallel to the ball screws 33 and 34, respectively. The ball screws 33 and 34 are driven by a ball screw driving motor 41 mounted on the casting fin removing apparatus 11 through belts 39 and 40, and move the bases 29 and 30 up and down in parallelism to the axis 7 of the aluminum wheel.

The operation of the casting fin removing apparatus, 11 will now be described. The aluminum wheel 1 (or 1') is loaded onto the chuck stand 13 of the casting fin removing apparatus 11 by a loader, not shown. The three-pawl chuck 14 then chucks the wheel at a position in which the line 8 passing through the two casting fins 4a is perpendicular to the apparatus center line 12 and in which the center line 7 of the aluminum wheel 1 and the center line 16 of the chuck unit 15 align with each other.

Figure 5:
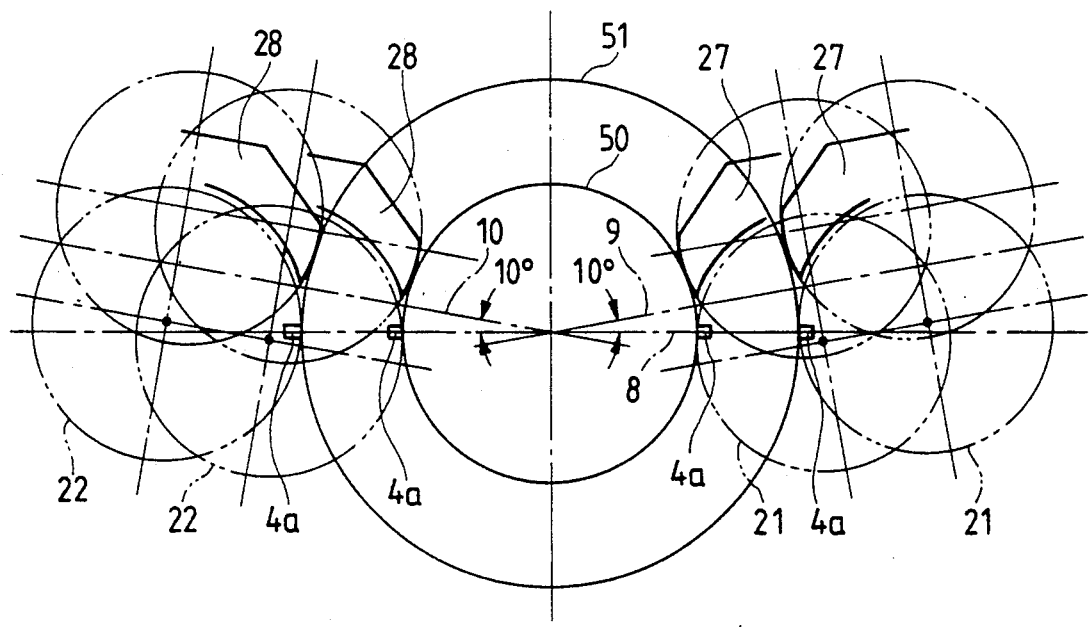
FIG. 5 is an illustration showing the positional relation between cutters and an aluminum wheel.

After the aluminum wheel 1 is fixed on the chuck stand 13, the two mutually opposed head units 17 and 18 are moved toward the wheel along the straight lines 9 and 10 (inclined at about 10° with respect to the line 8 passing through the two casting fins 4a of the aluminum wheel 1 and the center axis of the aluminum wheel 1) by the longitudinally moving mechanisms 31 and 32, and are stopped by the styluses 27 and 28 contacting with the tire-mounting surface 4 of the aluminum wheel 1. The details of the positional relation between the cutters 21, 22 and the aluminum wheel 1 when the head units 17 and 18 are moved back and forth are shown in FIG. 5. Each cutter 21 or 22 and corresponding stylus 27 or 28 are moved toward the aluminum wheel 1 such that a line perpendicularly bisecting a segment connecting the center of the cutter and the center of a circle defined by the tip end of the corresponding stylus aligns with the corresponding one of straight lines 9 and 10 (which intersect each other at the center of the aluminum wheel 1 at an angle of about 10° with respect to the straight line 8 passing through the two casting fins 4a created on the tire-mounting surface 4 of the aluminum wheel 1 at an angle interval of 180° and the center axis of the aluminum wheel 1).

An aluminum wheel will usually have a tire diameter of 12-17 inches, with the diameter of the opposite side of the wheel (i.e., the diameter of the flange portion 3) being larger by about 50 mm than the diameter of the central portion of the tire-mounting surface 4. In FIG. 5, a circle 50 is the circumference of the central portion of an aluminum wheel whose tire diameter is smallest, i.e., 12 inches. When the styluses 27 and 28 bear against the circle 50, the tip ends of the cutters 21 and 22 deviate in one direction (downwardly as viewed in FIG. 5) from the centers of the casting fins 4a. Another circle 51 is the circumference of opposite side portions of an aluminum wheel whose tire diameter is largest, i.e., 17 inches. When the styluses 27 and 28 bear against the circle 51, the tip ends of the cutters 21 and 22 deviate in the other direction (upwardly as viewed in FIG. 5) from the centers of the casting fins 4a. In any case, the cutters 21 and 22 can be brought into contact with the surface to be machined with sufficient machining accuracy for the removal of the casting fins 4a.

When the cutters 21 and 22 contact with the surface to be machined, the head units 17 and 18 are moved up and down in parallelism to the center line 7 of the aluminum wheel 1 by the ball screws 33 and 34. At this time, the styluses 27 and 28 are urged against the aluminum wheel 1 by the longitudinally moving mechanisms 31 and 32 each comprising an air cylinder, etc. As the head units 17 and 18 are parallel-moved along the center line 7 of the aluminum wheel 1, the casting fins 4a are accurately removed by the cutters 21 and 22 because the styluses 27 and 28 always follow the tire-mounting surface 4.

Figure 6:
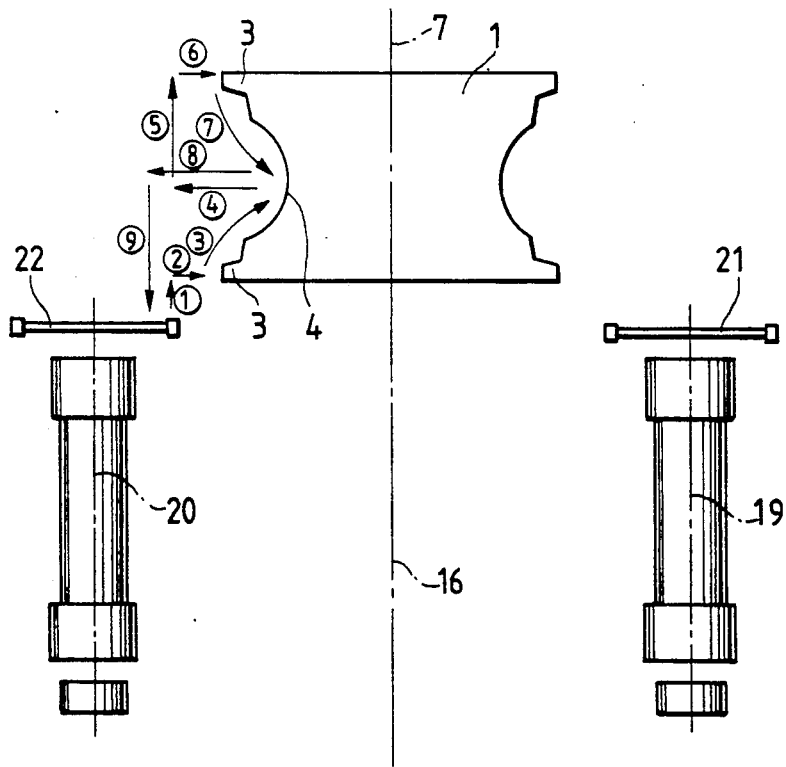
FIG. 6 is an illustration showing the moving operation of the cutters according to an embodiment of the present invention.

The moving operation of the cutters 21 and 22 will now be described with reference to FIG. 6. As shown in FIG. 6, the cutters 21 and 22 bear against the flange portion 3 of the aluminum wheel 1 (steps ①and ②), and move up along the tire-mounting surface 4 (step ③). Because the outside diameter of the tire-mounting surface 4 becomes gradually larger when the center of the width of the aluminum wheel 1 is passed, the cutters 21 and 22 are retracted (step ④) when they have passed the center of the width of the aluminum wheel 1, whereafter they move up by the rest of the width (step ⑤). Then the cutters 21 and 22 move forward (step ⑥) and bear against the upper flange portion 3 of the aluminum wheel 1, whereafter they move down along the tire-mounting surface 4 (step ⑦) and remove the rest of the casting fins 4a. When they move down to the center of the width of the aluminum wheel 1, the cutters 21 and 22 are retracted (step ⑧), and then move down (step ⑨), thus terminating the cycle of removing the casting fins 4a of the aluminum wheel 1. The process may then be repeated for removing the casting fins of a new aluminum wheel.

As has been described above, according to the present invention, it is possible to accurately remove casting fins from the tire-mounting surfaces of aluminum wheels differing in configuration and dimensions.

While a preferred embodiment of the fin removing apparatus according to the present invention has been shown and described herein, the present invention clearly is not restricted to the illustrated embodiment, and may incorporate various changes or modifications within the scope of the appended claims.

What is claimed is:

1. A casting fin removing apparatus for removing a casting fin extending on a tire-mounting surface of an aluminum wheel along an axial direction of the aluminum wheel, comprising:

positioning means for positioning a center of the aluminum wheel at a predetermined position and positioning said casting fin on a predetermined line passing through said predetermined position;

stylus means for movement following a profile of the tire-mounting surface of the aluminum wheel;

a cutter having a rotary shaft parallel to a center axis of the aluminum wheel as positioned by said positioning means;

and means for moving said cutter into cutting engagement with the casting fin along a second line passing through said predetermined position at a predetermined angle with respect to said predetermined line, and for moving said cutter along the tire-mounting surface of the aluminum wheel in accordance with said movement of said stylus means to thereby remove the casing fin.

2. An apparatus according to claim 1, wherein a tip end of said stylus means is arcuate and has a radius equal to a radius of said cutter.

3. An apparatus according to claim 2, wherein said second line perpendicularly bisects a line segment which connects a center of said cutter and a center of a circle defined by said tip end of said stylus means.

4. An apparatus according to claim 1, wherein said predetermined angle is about 10°.

* * * * *